UNITED STATES PATENT OFFICE.

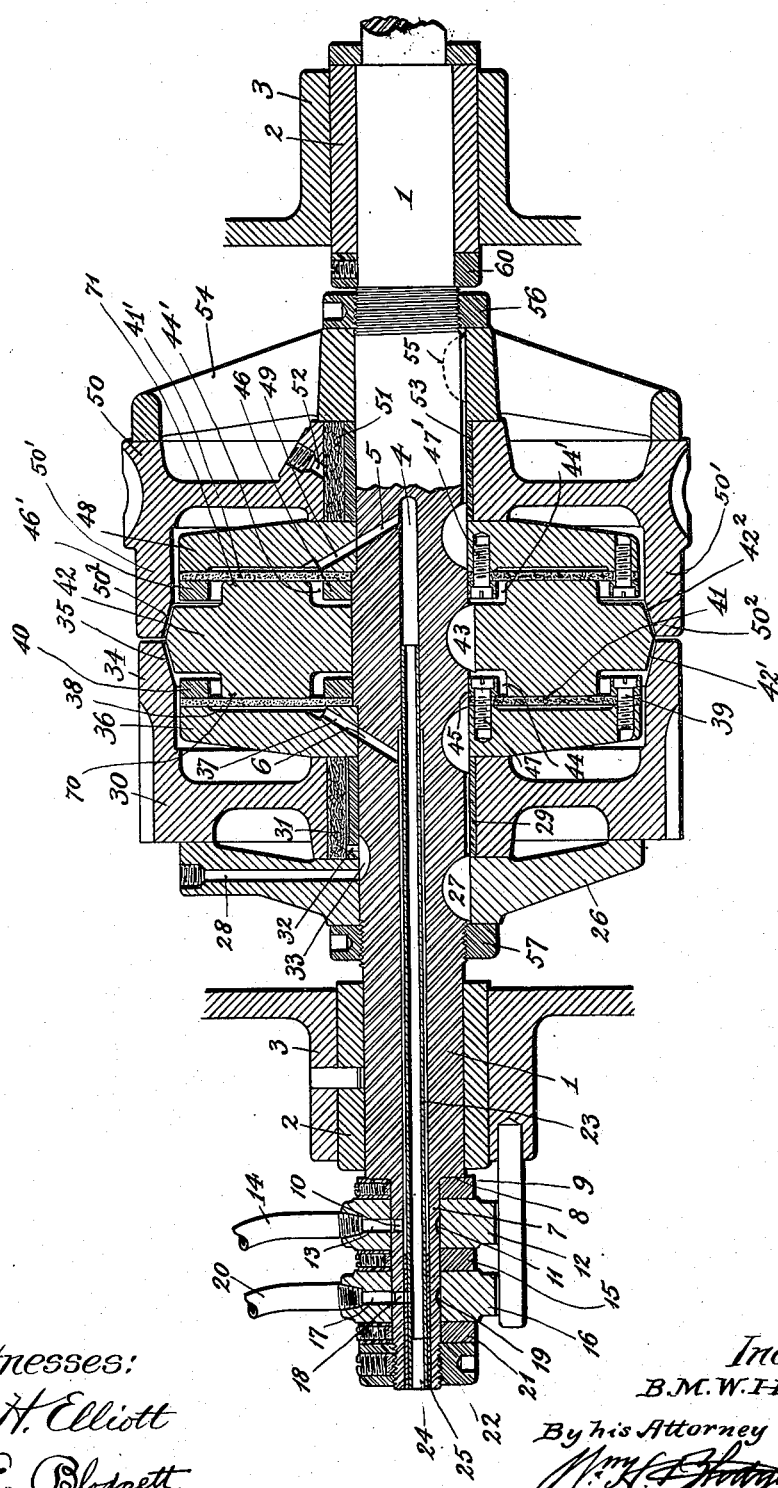

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FRICTION-CLUTCH.

No. 847,575.           Specification of Letters Patent.           Patented March 19, 1907.

Application filed October 13, 1906. Serial No. 338,865.

*To all whom it may concern:*

Be it known that I, BENGT M. W. HANSON, a citizen of Sweden, having declared my intention of becoming a citizen of the United States, residing at Hartford, in the county of Hartford and State of Connecticut, have invented certain new and useful Improvements in Friction-Clutches, of which the following is a specification.

This invention relates to friction-clutches of the kind in which clutching action is maintained by a flexible diaphragm actuated by fluid-pressure.

One object of the invention is the provision of a diaphragm, pressure mechanism for distending the same, and a slidable element actuated by said diaphragm and having a clutch-surface adapted when the diaphragm is distended to engage a member loosely mounted on the shaft with which the clutch is employed and to lock said member to said shaft.

Further objects of the invention are the provision of improvements in the various elements whereby either of two members loose on the shaft may be engaged with a clutch slidable on and keyed or splined to said shaft and whereby when the slidable member is in a neutral position neither of the loosely-mounted members will be connected to the shaft.

In the accompanying drawings the figure represents a longitudinal vertical section of clutch mechanism involving my improvement, and in said figure like numerals designate similar parts.

Referring to the drawing, the numeral 1 designates a shaft journaled in suitable bearings 2 of the standards or other parts of a frame 3, said shaft having a longitudinal bore 4 and reversely-inclined passages 5 and 6 leading from said bore.

One extremity of the shaft is reduced at 7, thus forming a shoulder 8 adjacent to the bearing 2, and secured to the shaft and fitting against said shoulder is a collar or washer 9. A port 10 and a groove 11 are formed in the reduced part of the shaft, and loose on said shaft and surrounding said port and groove is an annulus 12, having a passage 13, into the end of which is threaded a conduit 14, leading to a source of fluid-supply. (Not shown.)

Secured to the shaft adjacent to the annulus 12 is a collar or washer 15, and loose on said shaft and in contact with said collar is a second annulus 16, having a passage 17 communicating with a port 18 and groove 19 of said shaft, fluid under pressure being conducted to said annulus by a pipe 20. To the end of the reduced part of the shaft a washer 21 is secured, and on the extreme end of the shaft is threaded a nut 22, which bears against the washer.

Within the bore of the shaft is a tube 23, closed at its outer end by a plug 24, and surrounding said outer end of the tube is a bushing 25, having a port communicating with the port 18 of said shaft.

Designated by 26 is a disk having a curved or cup-shaped inner side, said disk being secured to the shaft by a key 27 and being provided with a passage 28 for the reception of lubricant.

Designated by 29 is a bushing inserted in the hub of an element 30, shown as a spur-gear loose on the shaft, although the invention is not limited in this respect. A pad 31, of felt or other substance for absorbing lubricant, is fitted in a groove of the element 30, and communication from said pad to the shaft is established by a port 32 in the bushing 29 and a passage 33 in said shaft.

Projecting from the inner side of the element 30 is a flange 34, having in the exemplification given an inclined friction clutch-surface 35, and keyed to the shaft is a disk 36, having a passage 37 in registration with the passage 6 of the shaft, the inner face of the disk being chambered at 38 for a purpose hereinafter described.

Clamped to the edge of the disk 36 by screws 39 is a ring 40, and secured in place by said ring and a ring 45 is a diaphragm 41.

Designated by 42 is a clutch member keyed to the shaft at 43 and having a sliding movement on said key. This clutch member is of peculiar configuration, it being reduced on each side at 44 44' to afford space for the clamping-rings 45 46, secured to the disks 36 and 48 by the screws 47 47' and having a narrow rim or circumferential rib inclined on its periphery at 42' 42² to form clutch-surfaces. A passage 49' leads from the chamber 48' of disk 48 to the passage 5 in shaft 1.

Designated by 50 is a loosely-mounted element shown as a worm, said element having a flange 50', provided with an inclined clutch-surface 50², receding from its edge and cooperating with the complemental clutch-surface 42² of the member 42. This element 50 is provided with a pad 51, of felt or other absorbent material, and leading to said pad is an inclined passage 52, to which lubricant may be supplied in any well-known way. A bushing 53 is driven into the hub of the element 50, and a spider 54, keyed to the shaft 1 at 55 and held in place by a nut 56, prevents movement of said element. A collar 60 is secured to shaft 1 adjacent to the inner end of the bearing 2.

Premising the description of the operation of the invention, it is distinctly to be understood that any suitable clutch-surfaces may be substituted for the inclined friction-surfaces illustrated without departure from the invention and that while the elements 30 and 50 are shown as driven elements this condition may be reversed, and suitable pulleys, gears, or other devices may be substituted therefor, if desired, the shaft then operating as a driving-shaft instead of a driven shaft, as shown.

Fluid under pressure—for instance, compressed air—being supplied to pipe 14 by valve mechanism (not shown) will enter the bore 4 of the shaft 1 and the passages 6 and 37 and chamber 38 of disk 36, thereby forcing the diaphragm 41 into engagement with the flat face of the clutch member 42, thereby forcing said clutch member longitudinally of the shaft and causing an engagement of the element 50 with the shaft. As said clutch member is forced to the right its flat face 71 will slightly dilate the diaphragm 41'. The air in the chamber of disk 48 being exhausted through passages 49 and 50 into the bore 4 of the shaft, clutch connection is then established between the element 50 and the shaft, and the latter will be rotated at a slow speed by the worm in mesh with the worm-gear thereon. Should it be desirable to connect the element 30 to the shaft-fluid under pressure is admitted to conduit 20 and passing through the tube 23 will enter passages 5 and 49, expand the diaphragm 41', and force the clutch member 42 to the left, thus causing an engagement between the inclined surfaces 35 and 42' and coupling the gear 30 to the shaft 1. In this way the clutch member 42 may be alternately engaged with the elements 30 and 50 to cause the shaft to be driven at different speeds, or the member 42 may be thrown to a neutral position between the two engaging clutch-surfaces when no connection is desired to said shaft.

Changes may be made in various details of the construction, the invention not being limited to the precise construction shown and described.

Having thus described the invention, what I claim is—

1. The combination, with a shaft, and with a clutch member slidably connected thereto, and having clutch-surfaces, of a pair of elements loosely mounted on the shaft, one on each side of said clutch member; carriers rigid with the shaft-diaphragm carried by each of said carriers; and fluid-controlled devices for distending the diaphragms to cause the clutch member to be shifted into engagement with either of said loosely-mounted elements.

2. The combination, with a shaft, and with a clutch member slidably connected thereto, of disks on said shaft; diaphragms carried by the disks; elements loose on the shaft, and each having a clutch-surface; and means for admitting fluid under pressure to points where it will act upon either of said diaphragms.

3. The combination, with a shaft, and with a clutch member keyed thereto, and movable longitudinally of said shaft, of carriers on each side of said clutch member; diaphragms connected to the carriers; elements loosely mounted on said shaft, one on each side of the respective carriers; and fluid connections for distending said diaphragms.

4. The combination, with a shaft, and with a member slidably connected thereto and having a peripheral clutch-surface, of a carrier; a diaphragm secured to the carrier; a complemental clutch element also having a clutch-surface to engage the clutch-surface of the slidable member; and fluid-pressure connections for expanding the diaphragm, and forcing the clutch member into contact with said complemental clutch element.

5. The combination, with a shaft, having a bore, and a passage leading from said bore, of a carrier rigid with the shaft; a diaphragm secured to the carrier; an element loose on the shaft, and having an overhanging clutch element; a sliding clutch member under control of said diaphragm and adapted to engage the overhanging clutch element; and fluid-pressure devices for actuating the diaphragm.

6. The combination, with a shaft having a bore, of passages leading from said bore, a clutch member slidably connected to said shaft; a pair of carriers one on each side of said clutch member, and having passages communicating with those of the shaft; diaphragms secured to said carriers; complemental clutch members loose on the shaft; fluid-pressure devices for distending the diaphragms, and connecting either of the loosely-mounted clutch elements to said clutch member.

7. The combination, with a shaft having a bore, and passages leading to said bore, of a tube within said shaft; fluid-pressure devices for supplying pressure either to the tube or to the shaft; a clutch member slidably connected to the shaft; carriers on each side of the clutch member; diaphragms secured to the carriers and located opposite the passages; and complemental clutch elements coöperating with said clutch member, and loosely surrounding the shaft.

In testimony whereof I affix my signature in presence of two witnesses.

BENGT M. W. HANSON.

Witnesses:
F. E. ANDERSON,
WM. H. BLODGETT, Jr.